Oct. 1, 1929.  C. PARKER  1,730,236
PROCESS OF AND APPARATUS FOR MAKING CHAIN
Filed Dec. 18, 1924  5 Sheets-Sheet 1

Fig. 1

INVENTOR.
Charles Parker
BY
G. H. Braddock
ATTORNEY

Oct. 1, 1929.  C. PARKER  1,730,236

PROCESS OF AND APPARATUS FOR MAKING CHAIN

Filed Dec. 18, 1924   5 Sheets-Sheet 2

INVENTOR.
Charles Parker.
BY
G. H. Braddock
ATTORNEY

Oct. 1, 1929.　　　　C. PARKER　　　　1,730,236

PROCESS OF AND APPARATUS FOR MAKING CHAIN

Filed Dec. 18, 1924　　　5 Sheets-Sheet 4

INVENTOR.
Charles Parker.
BY
G. H. Braddock
ATTORNEY.

Oct. 1, 1929.  C. PARKER  1,730,236
PROCESS OF AND APPARATUS FOR MAKING CHAIN
Filed Dec. 18, 1924   5 Sheets-Sheet 5

INVENTOR.
Charles Parker.
BY G. H. Braddock
ATTORNEY

Patented Oct. 1, 1929

1,730,236

UNITED STATES PATENT OFFICE

CHARLES PARKER, OF BRIDGEPORT, CONNECTICUT, ASSIGNOR TO THE LOCKE STEEL CHAIN COMPANY, OF BRIDGEPORT, CONNECTICUT, A CORPORATION OF CONNECTICUT

PROCESS OF AND APPARATUS FOR MAKING CHAIN

Application filed December 18, 1924. Serial No. 756,670.

This invention relates to a novel process of and improved apparatus for making chain. It pertains essentially to the manufacture of special types of sheet metal conveyor or elevator chain, and is an improvement upon the inventions of Herman Osswald disclosed and patented in his Letters Patents of the United States, No. 1,107,831, granted August 18, 1914, and No. 1,157,175, granted October 19, 1915.

The broad objects of the invention are to provide a method which will greatly facilitate the manufacture of conveyor or elevator chain having offset or special attachments or wings, and will, at the same time, be capable of producing chain superior in quality to any of the same kind heretofore made, and to provide simple and practical apparatus whereby the method can be practiced.

Drive chain is customarily manufactured from flat sheet metal strip by feeding the strip forwardly step by step to suitable forming dies, such, for example, as those illustrated and described in the patents above identified, constructed to transform the strip into links and to successively connect each link as formed with the next preceding formed link. Heretofore, conveyor or elevator chain having offset or special attachments or wings has been produced from relatively wide, flat sheet metal strip by practicing methods and utilizing apparatus suitable for the purpose of making drive chain, the apparatus having additionally included mechanism for cutting away portions of the strip to equip the links of the chain with flat attachments or wings extending in opposite directions from the side edges of the links and in alignment therewith, and afterwards bending said flat attachments or wings, to any preferred positions with respect to the links, to provide desirable offset or special attachments or wings. But the bending of the flat attachments or wings after the links have been formed and connected is a tedious operation not productive of very good results and not accomplished without great difficulty and considerable labor, mainly for the reason that the body portions of the links are liable to become more or less distorted during the bending operation, no matter what available means may be applied to prohibit distortion or how much force may be employed upon the body portions to prevent spreading of the side bars of the links.

The specific objects of the invention are, therefore, to devise a method which can be continuously practiced upon a single machine to manufacture special types of sheet metal conveyor or elevator chain, and to provide in said machine suitable apparatus, consisting of properly correlated forming dies, capable of systematically and practically carrying out the steps of the method.

Other objects and advantages of the invention will be obvious from the drawing and description of construction and operation of a machine, equipped with the improved apparatus and capable of carrying out the steps of the novel method, herein selected for the purpose of illustration.

In the accompanying drawing forming a part of this specification.

Figure 1:
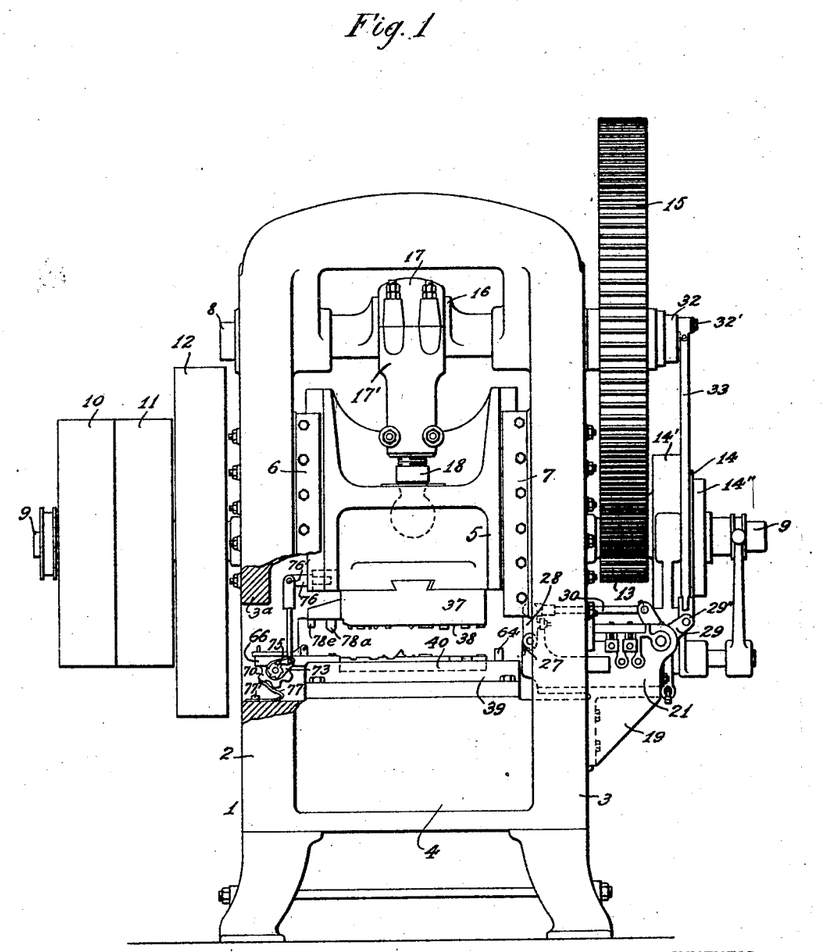
Fig. 1 is a front view, partly in section, of a machine equipped with the apparatus and capable of carrying out the steps of the method of the invention.

In the drawings, 1 indicates as an entirety the main frame of the machine comprising uprights 2, 3, and a bed 4 arranged between the uprights.

5 is a vertically reciprocatable slide mounted to move up and down in guides 6, 7, on the main frame.

8 is a main drive shaft transversely mounted in bearings at the upper end of the frame. 9 is a counter shaft transversely mounted upon the main frame and extending from one side to the other thereof. At one side of the main frame the counter shaft carries a loose pulley 10, a fast pulley 11, and a fly wheel 12. At the other side of the frame the said counter shaft has mounted loosely upon it a pinion 13 carrying one element 14' of a clutch 14, the other element 14'' of which is splined to the counter shaft 9. Any suitable mechanism may be employed for throwing the longitudinally movable element 14'' of said clutch into and out of engagement with the element 14', so as to transmit power through the pinion 13. 15 is a gear wheel rigidly secured to said main shaft and in mesh with the pinion 13.

16 is an eccentric on the main shaft 8 connected by eccentric straps 17, 17' and pitman 18 to the slide 5.

As the construction of the press itself forms no part of my invention, any well known type of press having a reciprocatable slide and a bed or bolster beneath it may be readily adapted to operate the chain link forming and assembling mechanism to be hereinafter described, and no further description of the press shown in the drawings is deemed necessary, as this particular press has been chosen simply for illustrative purposes and not in any limiting sense.

Figure 2:
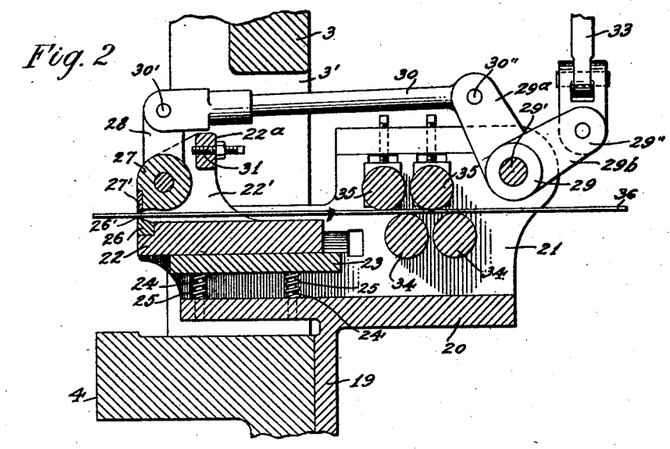
Fig. 2 is a view partly in side elevation and partly in section of the strip feed mechanism on said machine.

Any suitable mechanism may be attached to the press for feeding the stock or strip of metal from which the chain links are to be formed across the bed or bolster of the press. For the purpose of illustration, I have, in the drawings, shown a feed mechanism of which 19 is a bracket secured to the standard 3 of the frame and having a horizontally disposed platform 20, the inner end of which extends into a hole 3' through the standard 3.

Figure 3:
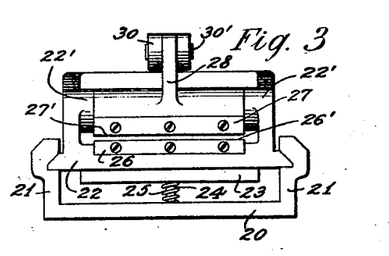
Fig. 3 is a front view of a portion of the strip feed mechanism, detached.

21, 21, are side walls extending vertically upward, one at each side of the platform 20. 22 is a horizontally reciprocatable slide suitably mounted at either side in guideways in the said side walls 21. It rests upon a horizontally disposed friction plate 23 having downwardly extending pins 24, 24, each surrounded by a coil spring 25 bearing at its upper end against the plate 23 and at its lower end against the platform 20 so as to provide a yielding support for the slide 22 which normally tends to press the slide against the upper walls of its guideways to insure the closing of the feed jaws, to be hereinafter described, before the slide commences to move forward.

26 is a gripping piece carried by the slide 22, having an upwardly turned jaw 26' adapted to engage the under surface of the stock or strip of metal to be fed across the bed or bolster.

27 is an oscillatable gripping dog having a jaw 27' adapted to engage the upper surface of the strip of metal to be fed, at a point directly above the gripping jaw 26'. This gripping jaw 27 is pivotally mounted between upwardly extending lugs or ears 22', 22', on the slide 22, and carries an upwardly extending arm 28.

29 is a bell crank lever pivotally connected at 29' between the side walls 21 of the bracket 19.

30 is a rod pivotally connected at 30' to the upper end of the arm 28, and at 30'' to the free end of the arm 29ª of the bell crank lever 29.

31 is an adjustable stop for limiting the throw of the arm 28 in clockwise direction. This stop preferably consists of a screw extending through a threaded opening in a cross bar 22ª which latter extends between the ears 22', 22', on the slide 22.

32 is a crank disc carried by the main drive shaft 8 and having a crank pin 32' to which is pivotally connected one end of a connecting rod 33, the other end of which is suitably connected to the free end of the arm 29'' of the bell crank lever 29.

34, 34, and 35, 35, are straightening rolls for the strip of metal or stock. These rolls are horizontally disposed and suitably mounted between the side walls 21, 21 on the bracket 19. A strip of metal, indicated by 36, is directed between the rolls 34, 34, and 35, 35, and between the gripping lips 26' and 27'. The dog 27 and arm 28 are shaped and proportioned to have a slight rocking movement relative to the slide 22, so that in normal operation, as the connecting rod 30 is drawn to the right in Figs. 1 and 2, the gripping jaw 27' is rocked out of engagement with the upper surface of the strip of metal 36. The arm 28 then engages the stop 31 and the slide 22 recedes with the connecting rod 30. Upon the reversal of travel of the rod 30, it rocks forward the upper end of the arm 28 and causes the gripping jaw 27' to engage the upper surface of the strip 36, thereby gripping the said strip firmly between the jaws 26' and 27', and the slide 22 and strip 36 are together fed forward.

Figure 6:
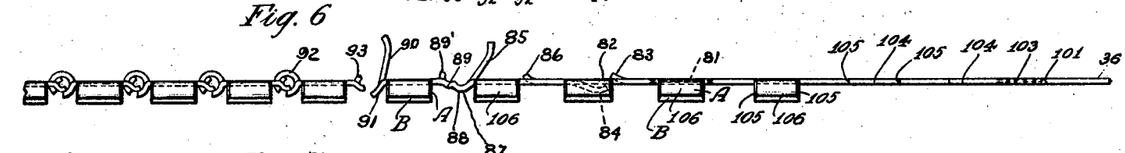
Fig. 6 is an edge view of a strip of metal in process of formation into a chain, some formed and coupled chain links being shown.
Figure 7:
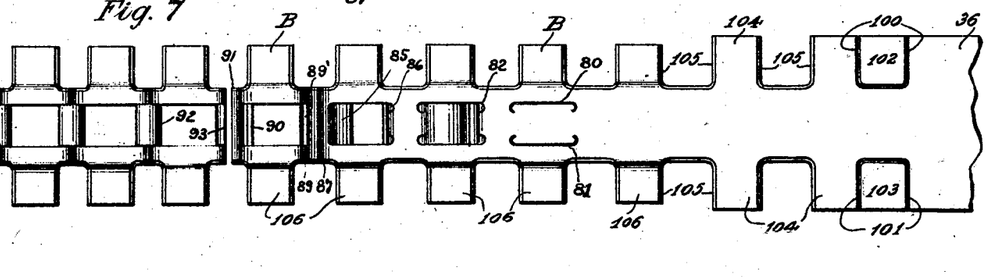
Fig. 7 is a plan view of the metal strip and chain shown in Fig. 6.
Figure 8:
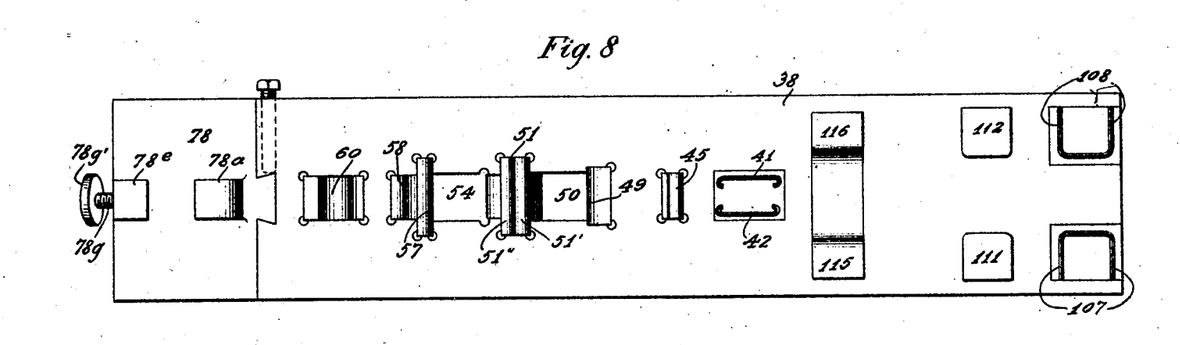
Fig. 8 is a bottom plan view of the movable die and stretcher mechanism on the machine.

In practicing the novel method of the invention, I first produce upon the upper and lower surfaces of said strip of metal and adjacent the side edges thereof, areas of score, denoted by 100, 101, marking the outlines of portions 102, 103 of the metal to be removed to define the flat attachments or wings 104 of the individual links of the chain, the areas of score being preferably made with a view of providing beveled edges 105 upon the side edges of each attachment or wing, as will be understood, so that all of the same can be later bent to produce offset or special attachments or wings of desirable shape arranged at preferred angular positions with respect to the links without liability of the objectionable production of bur or the cracking of the attachments or wings; I next sever the metal along the areas 100, 101, thus removing the portions 102, 103 from the strip and producing the flat attachments or wings 104; I next bend the flat attachments or wings to produce the offset or special attachments or wings 106; and I then proceed by the performance of any operations suitable for the production of ordinary drive chain, preferably those operations hereinafter fully set forth and very clearly outlined in the Osswald Patent No. 1,157,175, granted October 19, 1915, hereinbefore called to attention.

Figure 4:
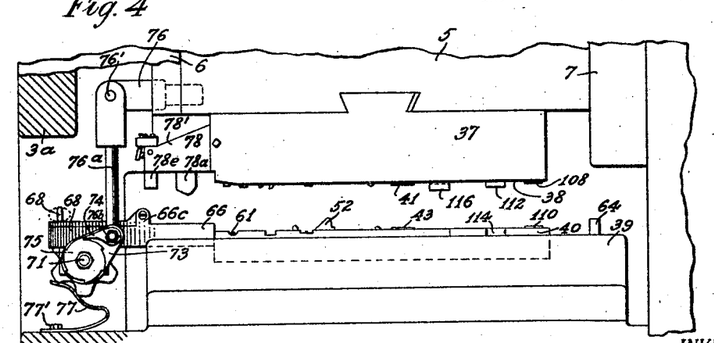
Fig. 4 is a front view of the improved apparatus or forming dies, extracting mechanism and sizing mechanism on said machine.
Figure 5:
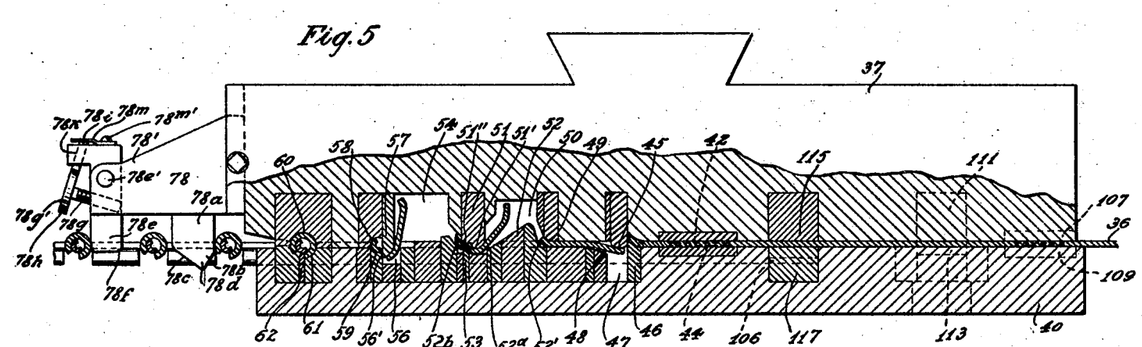
Fig. 5 is an enlarged view of the dies, showing them in section with a strip of metal between them, a portion of the sizing mechanism being also shown.

Of the apparatus for carrying out the steps of the method, 37 is a carrier or holder for the movable die, it being suitably connected to the slide 5. 38 represents as an entirety the movable die, it being suitably seated and held in the holder 37. 39 represents a bolster or die bed for the stationary die, detachably secured to the bed 4 in any suitable manner. 40 represents as an entirety a stationary die suitably secured in the die bed 39. The dies 38 and 40, which cooperate with each other to form and assemble the links, are arranged in longitudinal alignment with the line of feed of the strip 36 and are properly centered relative to the said line of feed.

107, 108 represent scoring knives or chisels arranged at the right hand end of the movable die 38, and 109, 110 represent corresponding scoring knives or chisels carried upon the stationary die 40, said scoring knives or chisels being adapted to impart the areas of score 100, 101 to the upper and lower surfaces of the strip 36, and being constructed to provide the beveled edges 105 already mentioned.

111, 112 are punch elements upon the movable die adapted to remove the portions 102, 103 from the strip, and 113, 114 are recesses in the stationary die cooperating with the punch elements 111, 112.

115, 116 are bending elements upon the movable die adapted to shape the flat attachments or wings 104 to produce the offset or special attachments or wings 106, the bending elements being of any suitable and preferred construction to produce desirable offset or special attachments or wings and to set the same at preferred positions with respect to the middle portion of the strip, which portion furnishes the material of the bodies of the links, and 117, 118 are elements, constructed to cooperate with the bending elements 115, 116, arranged upon the stationary die.

The remainder of the elements of the apparatus for carrying out the steps of the process can be any that are suitable for the production of ordinary drive chain. I, however, preferably utilize the elements of the Osswald patent, No. 1,107,831, granted August 18, 1914, disclosed in the present drawing and now to be fully described, making suitable provision, as will hereinafter appear, for allowing the offset or special attachments or wings to advance without offering interference to the forward feeding of the strip of metal or to the proper working of any of the elements of the apparatus.

41, 42 are scoring knives or chisels arranged upon the movable die 38 and in advance of the bending elements 115, 116, adapted to impart lines of score to the upper surface of the strip of metal, which lines are approximately parallel in the direction of the feed of said strip.

43, 44 are corresponding scoring knives or chisels carried by the stationary die 40 and arranged to impart lines of score to the under surface of the strip of metal, each of which lines is directly beneath a line of score imparted by one of the upper scoring knives.

45 is a severing and crimping element on the upper die having a convex crimping surface. It is arranged to cooperate with a cutting and bending knife 46 on the lower die. The lower die is recessed at 47 in front of the cutting knife 46 and beneath the severing and crimping element 45. The metal of the stationary die 40 in front of the recess 47 is cut away along the inclined line 48 to permit a section of the metal of each link to be bent downwardly by the severing and crimping element 45 after it has been severed at one end by the combined action of this element and knife 46.

49 is a curved forming or crimping element on the movable die 38, about which the metal for forming the smaller end bar or pintle of each link is bent or crimped. In front of this former 49 is a recess 50, and in front of it is an irregularly shaped end bar forming punch element 51 consisting of two substantially quarter circles 51', 51''.

52 is a forming and bending projection on the stationary die, it being adapted to enter the recess 50 on the movable die.

52' is a shoulder on the projection 52 adapted to fold or crimp the metal for the small end of the link against the curved end of the element 49 on the movable die.

53 is a scoring knife of the stationary die adapted to impart a transverse score to the strip of metal along the line of severance of two links which are to adjoin each other, and in conjunction with the forming corners 52ª, 52ᵇ, is adapted to force the metal of the link to follow the quarter circles 51', 51'', on the former 51. This scoring knife 53 is in vertical alignment with the line of intersection of the said two quarter circles of the punch element 51. In advance of the said punch element 51 the movable die is recessed as indicated at 54 to allow clearance for the free upturning of the long lip of the metal blank for a link, which at this step of its formation projects upwardly from the metal strip. At 56 the stationary die is recessed to receive a cutting or severing knife 57 on the movable die, the edge 56' being a knife edge to work in conjunction with the knife 57 to sever the metal strip. Immediately in front of the cutting knife 57, the movable die is shaped as indicated at 58 to complete the rounding and formation of the small end bar of each link in cooperation with the recessed section 59 of the stationary die. At 60 the movable die is recessed for the purpose of engaging the longer section or lip of metal turned up from the central portion of each link blank and bending, curling and conforming it to the cylindrical shape desired, at the same time causing it to encircle the small end bar or pintle of the link in front of it, thereby coupling or attaching these links together. The stationary die is recessed at 61 to cooperate with the recessed portion 60 of the movable die in the final shaping and forming of the large end bar of each link.

62 is a projection extending transversely across the recessed portion 61 of the stationary die. It serves to prevent the ends of the lips of metal forming the large end or sprocket bar of each link from engaging with each other and to space them apart a predetermined distance.

Figure 9:
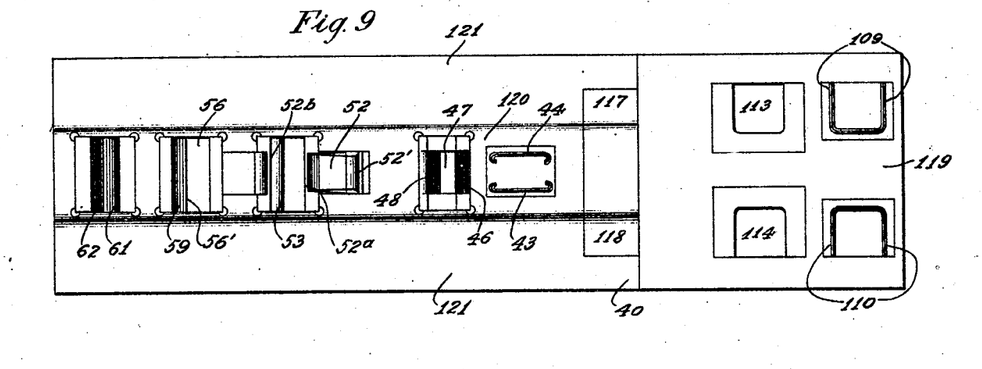
Fig. 9 is a top plan view of the stationary die on the machine.
Figure 10:
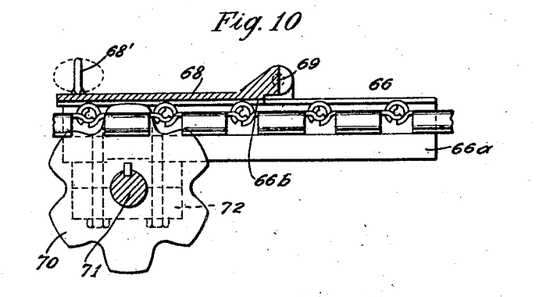
Fig. 10 is a section on line 10—10 in Fig. 11, illustrating a part of the link extracting mechanism.

As will be most clear from Figs. 5 and 9, the upper face of the stationary die 40 is of special construction. That is to say, that portion, denoted by 119, of said upper face upon which the operations prior to production of the offset or special attachments or wings 106 are performed, is constructed to properly support the full width of the flat sheet metal strip 36, while the remainder of said upper face consists of a relatively narrow portion 120 in the plane of the portions 119 and of about the width of the bodies of the links of chain being manufactured, the narrow portions 120 being arranged centrally of the portion 119, and the metal of the stationary die 40 being preferably cut away at both sides of the portion 120, as denoted at 121, to provide clearance for the offset or special attachments as they move forwardly.

Figure 13:
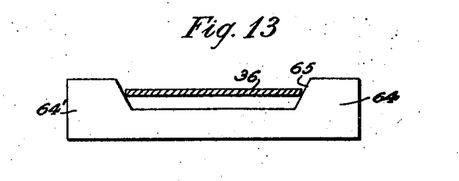
Fig. 13 is a front view of a metal strip guide, detached.

64 is a strip gage for centering the metal strip relatively to the forming dies as it is fed forward, step by step. It preferably consists of a bar of metal 64' arranged transversely on the stationary die bed 39 and suitably secured in position a little distance from the scoring knives or chisels 109, 110. In the top of this piece of metal is cut a V-shaped groove 65 with the axis of the V in the vertical central longitudinal plane of the dies. The walls of this V-shaped groove are preferably elevated somewhat above the horizontal plane of the stationary die and the width of the groove at its middle vertically is preferably of the width of the standard size strip to be used with the set of dies to which the gage is attached. The taper of the gage allows for variation in width of the strip of metal 36, so as to insure the proper centering of the strip despite its variation in width.

Figure 11:
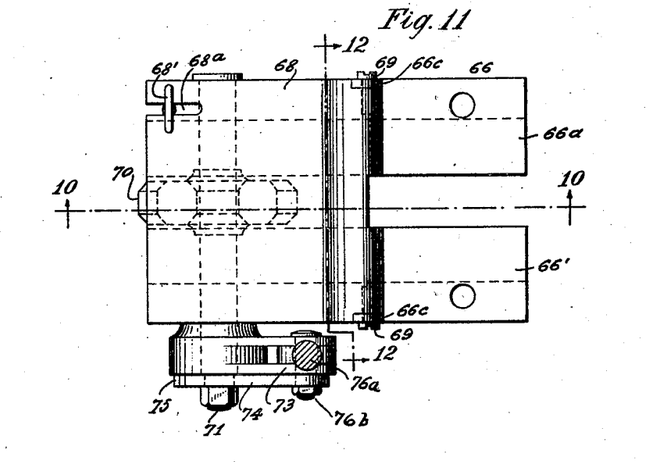
Fig. 11 is a plan view of a portion of the link extracting mechanism.
Figure 12:
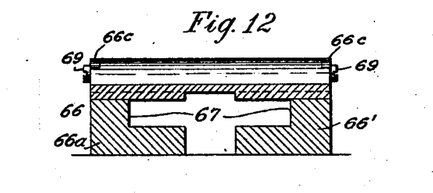
Fig. 12 is a section on line 12—12 in Fig. 11.

Mechanism may be employed for extracting and guiding the formed chain links out of the machine, of any suitable and well known character. For illustration, I have shown a chain guide 66 comprising two bars 66', 66ª, rigidly secured at their inner ends to the die bed 39, and projecting into the opening 3ª through the adjacent wall of the main frame of the machine. These bars are longitudinally grooved and recessed as indicated at 67 to constitute a guideway for the chain, the recesses being of sufficient dimensions to care for the offset attachments. The bars are recessed at 66ᵇ to receive a cover plate 68 which is pivotally connected at 69 between upwardly projecting ears 66ᶜ on the said guide bars.

68' is a thumb nut extending through a slot 68ª in the cover plate 68 and detachably fitted into the guide bar 66ª, for the purpose of holding down the cover plate 68.

70 is a sprocket wheel arranged between and projecting between the guide bars 66', 66ª. It is carried by a shaft 71 mounted in bearing blocks 72, each detachably secured to one of the aforesaid guide bars.

73 is a pawl carrying arm loosely mounted on the shaft 71. 74 is a pawl pivotally connected to the arm 73. 75 is a ratchet wheel rigidly secured to the shaft 71 and having its teeth in the plane of the pawl 74.

76 is a lug or projection carried by the slide 5. It is pivotally connected at 76' to the rod 76ª, the lower end of which is pivotally connected at 76ᵇ to the pawl arm 73.

77 is a spring having one end secured at 77' to the frame on the machine, and its other end bearing against the teeth of the sprocket wheel 70 to offer a frictional resistance to the rotation of the latter.

Any suitable mechanism may be employed for the purpose of correcting the size and pitch of the chain links. The size and pitch correcting mechanism is indicated as a whole by the reference numeral 78. Of this mechanism, 78' is an arm extending forward from and preferably detachably secured to the die holder 37. This arm 78' has formed preferably integral with it, a downwardly extending finger 78ª which is pointed at its lower end as indicated at 78ᵈ, the rear surface 78ᵇ of the said pointed finger being shorter than and at greater inclination to the horizontal than the front surface 78ᶜ of the said finger. This finger 78ª is arranged to enter the sprocket opening in the last link but one of the links formed in the machine.

78ᵉ is a block or finger pivotally connected at 78ᵉ′ in the bifurcated end of the arm 78′. This block or finger extends downwardly beneath the arm 78′, as indicated at 78ᶠ and is adapted to enter the sprocket opening in the link next preceding the link entered by the finger 78ª.

78ᵍ is an adjustment screw fitted in the finger 78ᵉ and adapted to extend on the rear side of the latter and bear against the arm 78′. Its purpose is to adjust the said finger 78ᵉ about the axis of the pivot 78ᵉ′ and toward or from the finger 78ª. The adjustment wheel 78ᵍ′ for the screw 78ᵍ has a toothed or serrated periphery 78ʰ.

78ⁱ is a lock pawl extending through an opening in the forward projection 78ᵏ of the finger 78ᵉ, and engaging with the periphery of the thumb wheel 78ᵍ′ to hold the wheel at any point of adjustment.

78ᵐ is a spring bearing at one end against the lock pawl 78ⁱ and having its other end secured at 78ᵐ′ to the finger 78ᵉ.

The distance between the front wall of the downward extension 78ᶠ of the finger 78ᵉ and the rear wall of the finger 78ª remains substantially constant when the machine is in operation. If a link is shorter in pitch than it should be, these sizing fingers bring it up to proper pitch by stretching it. In practice it has been found desirable to form and arrange the dies 38 and 40 for making of the desired and proper pitch, chain links from the thinnest sections of the strip of steel used, depending upon the stretcher or pitch correcting device 78 to draw the links formed from the thicker sections of the strip of metal up to gage.

The operation of the machine will be readily understood. A strip of metal 36 is directed through the feed mechanism until the gripping jaws 26′, 27′ of said feed mechanism can engage with it. Power is then applied through the counter shaft 9 to actuate the feed mechanism and slide 5. The strip 36 is guided and centered by the gage 64, so as to lie properly between the dies 38 and 40. The slide 5 descends and a section of metal which is to form a link blank is first acted upon by the scoring knives or chisels 107, 109 and 108, 110 to make the areas of score 100, 101, as shown in Fig. 7. The upper die is then elevated and the feed mechanism operates to feed the stock forward one step. This brings the scored sections in position to be operated upon by the punch elements 111, 112. The slide descends and the portions 102, 103 are removed from the strip leaving flat attachments or wings 104 having beveled edges 105. When the slide is next elevated, the feed mechanism advances the stock another step. The slide descends and the bending elements 115, 116 transform the flat attachments or wings 104, provided by cutting away the portions 102, 103, into the offset or special link attachments or wings 106. The slide is again elevated to advance the stock, and then descends so that the longitudinal scoring knives or chisels 41, 42, 43, 44 can score the upper and lower surfaces of the metal along the lines 80 and 81. The slide is again elevated to bring the scored section in position to be operated upon by the crimping and severing elements 45, 46, and when the movable die descends, the portion of metal between the lines of longitudinal score is severed along the transverse line 82. The knife 46 bends upwardly, as indicated at 83, the section of the central portion or short lip of the link blank which is to be employed in forming the small end bar or pintle of the link. The action of the severing knife and crimper 45 is to press downwardly and crimp the end of the longer section of the central portion or long lip of the link blank, as indicated at 84, which is to be employed in forming the large end or sprocket bar of the link before the severing of the sections takes place. The short lip 83 of each link blank is sufficiently raised by the knife 46 to give clearance for bending upwardly the long lip of the blank. When the slide is next elevated, the feed mechanism advances the stock another step. The slide descends and the projection 52 on the stationary die acts to bend upwardly the long narrow lip for the large end bar of the link, as indicated at 85, simultaneously breaking the metal of the link blank along the lines of scoring and freeing the said long narrow lip so that it can remain tangent to the quarter circle 51′ on the forming element 51. At the same time, the shoulder 52′ on the projection 52 folds or crimps the short narrow lip for the small end bar, as indicated at 86, against the convex forming surface of the element 49 on the upper die. And the forming element 51′ on the upper die cooperates with the projection 52ª to throw the long narrow lip of the link up into the recess 50, this long narrow lip remaining always tangent to the larger quarter circle 51′ on the element 51. In cooperation with the scoring knife 53 and the crimping edge 52ᵇ, the quarter circle 51′ on the element 51 crimps the wide lip for the large end bar of the link, as indicated at 87. The movable die ascends and the link blank is fed forward. Now when the movable die descends, the scoring knife 53 imparts a transverse score 88 to the under surface of the strip of metal and the quarter circle 51″ of the element 51 in cooperation with the scoring knife 53 and the crimping edge 52ᵇ crimps the wide lip of the small end bar, as indicated at 89, and at the same time the narrow lip of the small end bar is thrown upward as indicated at 89'. The convex crimping surface of the element 57 cooperating with the forming edge 55', bends downwardly the wide lip of the large end bar to its proper position in a finished link, as indicated at 91, and simultaneously the narrow lip of the large end bar, remaining tangent to the quarter circle of the element 57, is thrown almost into a vertical position, as indicated at 90. The slide is again elevated and the strip is fed forward another step, bringing the link blank into its final forming and assembling position. The slide descends and the element 60 commences to curl or roll the metal of the narrow lip of the large end bar into cylindrical shape and around the small end bar or pintle of the next preceding link. The knife edge of the element 57 acting in conjunction with the knife edge 56' on the stationary die, severs the link blank from the strip of metal, and the elements 61 and 62 on the stationary die coact with the element 60 to complete the shape of the large end bar, as indicated at 92. The small end bar completing shapers 58 and 59 cooperate to form the small end bar into its final shape, as indicated at 93. The slide is then elevated and the extractor pulls the completed link out of the stationary die, and advances it into position in which its small end bar is properly centered relative to the forming elements 60 and 61, so that the large end bar of the next link in the series will be formed around it and these two links thus assembled. One sprocket tooth of the sprocket wheel 70 projects through a formed link in the guide 66, so that when the slide 5 is elevated the pawl carrying arm 73 is rocked in anticlockwise direction. The pawl 74 engages a tooth on the ratchet wheel 75 and turns the latter together with the shaft 71 and the sprocket wheel 70, the rotation of the sprocket wheel being sufficient to advance a formed link one step. When the slide next descends, the pitch correcting finger 78$^a$ enters the next to the last formed link, its surface 78$^b$ engages the large end bar of the last formed link and moves rearward the last formed link, positioning said link with its small end bar overlapping the end of the strip 36 and properly centered relative to the forming elements 60, 61, the stretching and pitch correcting finger 78$^c$ enters the link coupled to the link entered by the finger 78$^a$, and these two fingers cooperate to correct the pitch of the links. At the next elevation of the slide, the extractor operates to advance the formed link another step, and this step by step advancing of the formed links within the machine is continued, one link at a time being delivered from the machine.

It will be seen that the dies operate simultaneously to perform progressive steps in the formation from a relatively wide, flat strip of metal of a completed link of special type having offset attachments, and to assemble said special link with the one next in front of it in the series.

The dies 38 and 40 are shown as being made up of a number of pieces or sections of metal. Such construction permits the relative adjustment of the various forming elements of each die, should one of them wear more than others, or the proper relationship of the forming elements be, for any reason, disarranged. It will be understood, however, that each of these dies or die blocks, in normal operation, consists of a plurality of relatively immovable link forming, shaping and connecting elements, and each as an entirety may be formed from a single piece of metal, if desired, so that the die will be solid throughout.

It will be evident that the process and apparatus utilized by me in making special types of sheet metal, as hereinbefore fully set forth, greatly facilitate the manufacture of conveyor or elevator chain having offset or special attachments or wings, and are capable of producing chain superior in quality to any of the same kind heretofore made, principally for the reasons that the process can be practiced upon a single machine, that the apparatus affords simple means for systematically carrying out the steps of the process, and that the bending of the flat attachments or wings to form the offset or special attachments or wings is accomplished before the links are formed, obviating any possibility of the finished links becoming distorted, as has been the case prior to the present invention. The attachments are formed along the edges of the strip on opposite sides of the center line thereof, and the dies for forming them are also disposed on opposite sides of the same center line, whereas the dies for forming the links are disposed along the center line of the strip as it is fed through the machine. It will likewise be evident that the bending elements can be of any suitable construction to produce offset or special attachments or wings of any desired shape, set at preferred positions with respect to the bodies of the links. As shown, the bending elements 115, 116 are constructed and arranged to produce offset attachments of general L-shape, each comprising a relatively short arm A extending at right-angles and downwardly from a side bar of a link, and a relatively long arm B, extending from the arm A and arranged parallel with the material of said side bar.

As has already been mentioned, the beveled edges 105 upon the side edges of the attachments or wings, render the material of the same not liable to crack when the offset attachments or wings are being produced, and practically preclude the possibility of the objectionable production of burr as a result of the bending.

To those skilled in the art of making chain and chain links of the character illustrated and described, many alterations in construction and widely differing embodiments and applications of the invention will suggest themselves, without departing from the spirit and scope of the claims. The disclosure and description herein are purely illustrative, and are not intended to be in any sense limiting.

What I claim is:

1. The process of making a link from a blank of sheet metal, said link having a special attachment, which consists in removing metal from the blank to produce an attachment, transforming the body of said blank into a link, and bending said special attachment relatively to said link.

2. The process of making a link from a blank of sheet metal, said link having a special attachment, which consists in removing metal from the blank to produce an attachment, in operating upon the blank to produce side and end bars of the link, and in shaping said attachment.

3. The process of making a link from a blank of flat sheet metal, said link having a special attachment, which consists in the following steps: first placing an area of score upon the upper and lower surfaces of said blank adjacent an edge thereof, next removing the portion of metal encompassed by said area of score to produce a flat attachment, then shaping said flat attachment to produce the special attachment, and finally transforming the part of said blank adjacent said special attachment into a link.

4. The process of making a link from a blank of flat sheet metal, said link having a special attachment, which consists in the following steps: first obliquely scoring an area of the upper and lower surfaces of said blank adjacent an edge thereof, next removing the portion of metal encompassed by said area of score to produce a flat attachment having beveled side edges, then shaping said flat attachment to produce the special attachment, and finally transforming the part of said blank adjacent said special attachment into a link.

5. The process of making a link from a blank of flat sheet metal, said link having an offset attachment, which consists in first removing parts of said blank to produce flat attachments, next shaping said flat attachments to produce offset attachments, and in afterwards successively operating upon the blank to produce side and end bars of the link.

6. The process of making a link from a blank of flat sheet metal, said link having an offset attachment, which consists in first obliquely scoring an area of said blank, next removing the portion of metal encompassed by said area of score to produce a flat attachment having beveled edges, then shaping said flat attachment to produce the offset attachment, and in afterwards successively operating upon the blank to produce side and end bars of the link.

7. The process of making a link from a blank of relatively wide, flat sheet metal, said link having offset attachments upon the opposite sides thereof, which consists in first placing areas of score upon the upper and lower surfaces of said blank to define portions to be removed, next removing said portions to provide flat attachments, then shaping said flat attachments to produce offset attachments, and finally acting upon said blank to produce side and end bars of said link.

8. The process of making a link from a blank of relatively wide, flat sheet metal, said link having offset attachments upon the opposite sides thereof, which consists in first placing oblique areas of score upon the upper and lower surfaces of said blank to define portions to be removed, next removing said portions to provide flat attachments having beveled side edges, then shaping said flat attachments to produce offset attachments, and finally acting upon said blank to produce said link.

9. The process of making a link from a blank of flat sheet metal, said link having a special attachment, which consists in the following steps: first removing a portion of said blank to produce a flat attachment at a side thereof, then shaping said flat attachment to produce a special attachment, then scoring the metal blank to define the inner edge of the side bars of the link, then substantially simultaneously crimping the central portion of the blank between said lines of score, transversely severing said central portion adjacent to said crimping, tearing the two sections of the center portion thus formed from the said side bars and bending them away from each other, then crimping the free end of the shorter center section, crimping the free end of the link blank and throwing around the free end of the longer center section, then crimping the rear end of the blank and throwing around the free end of the small center section, shaping the front end of the link blank into final form and at the same time throwing still farther around the free end of the longer center section, and then rolling up the free ends of both center sections into final shape.

10. The process of making a link from a blank of flat sheet metal, said link having a special attachment, side bars, a relatively small end bar, and a relatively large end bar, which consists in the following steps: first removing a portion of said blank to produce a flat attachment at a side thereof, then shaping said flat attachment to produce the special attachment, then scoring the metal to define the inner edges of the side bars, then transversely severing the metal between the two lines of score, then tearing the center sections thus formed from the side bars and bending one of the center sections away from the other center section, and then shaping the severed center sections into end bars at the ends of the links to which they are respectively attached.

11. The process of making a link from a blank of flat sheet metal, said link having special attachments, side bars, and end bars, which consists in the following steps: first placing areas of score upon the metal to define portions to be removed, next removing said portions to produce flat attachments, then shaping said flat attachments to produce special attachments, then scoring the metal to define the inner edges of the side bars, then transversely severing the blank between the two lines of score, tearing the center sections thus formed from the side bars, and then shaping the severed center sections into end bars at the ends of the link to which they are respectively attached and between said side bars and special attachments.

12. The process of transforming a strip of flat metal into a series of connected chain links each having a special attachment, which consists in the following progressive operations: first removing portions of the side edges of the metal strip to define flat attachments for the links, next shaping said flat attachments to produce special attachments, and finally performing step by step operations upon portions of said strip contiguous with said special attachments transforming the same into chain links and connecting each link as formed with the last formed link.

13. The process of transforming a strip of flat metal into a series of connected chain links each having a special attachment, which consists in the following progressive operations: first scoring areas of said strip adjacent the side edges thereof, next removing portions encompassed by the scored areas to define flat attachments for the links, then shaping said flat attachments to produce special attachments, and finally performing step by step operations upon portions of said strip contiguous with said special attachments transforming the same into chain links and connecting each chain link as formed with the last formed link.

14. The process of transforming a strip of flat metal into a series of connected chain links each having one or more special attachments, which consists in the following steps of formation for each link: first removing portions of the side edges of the strip to define flat attachments, next shaping said flat attachments to form special attachments, then acting upon the strip adjacent said special attachments to produce links having side and end bars, and finally connecting each link as formed with the next preceding formed link.

15. The process of transforming a strip of flat metal into a series of connected chain links each having one or more special attachments, which consists in the following steps of formation for each link: first scoring areas of said strip adjacent the side edges thereof, next removing portions defined by the scored areas to produce flat attachments, then shaping said flat attachments to produce special attachments, and finally acting upon the strip adjacent said special attachments to produce links having side and end bars and to connect each link as formed with the next preceding formed link.

16. The process of transforming a strip of flat metal into a series of connected chain links each having one or more special attachments, which consists in simultaneous operations first producing said special attachments, and afterwards producing said links, and connecting each link as formed with the next preceding formed link.

17. The process of transforming a strip of metal into a series of connected chain links each having one or more special attachments, which consists in simultaneous operations first producing said special attachments, next producing the side bars of the links, and finally producing the end bars of the links and connecting each link as formed with the next preceding formed link.

18. The process of transforming a strip of flat metal into a series of connected chain links each having one or more special or offset attachments, which consists in the following progressive steps of formation for each link between each of which steps the metal is fed forward: first removing portions of the metal strip to define flat attachments, next shaping said flat attachments to form special attachments, then scoring the metal to define the inner edges of side bars, then transversely severing the metal of the strip between the two lines of score, tearing the center sections thus formed from the side bars, and then shaping the severed center sections into end bars, and finally connecting each link as formed with the next preceding formed link.

19. The process of transforming a strip of metal into a series of connected chain links each having one or more special attachments, which consists in the following progressive steps of formation for each link between each of which steps the metal strip is fed forward: first placing areas of score upon the strip of metal, next removing portions of the metal strip encompassed by the areas of score to define flat attachments, then shaping the flat attachments to produce special attachments, then scoring the metal strip to define the inner edges of side bars of the links, then substantially simultaneously crimping the center portion of each link blank between said lines of score, transversely severing said center portion adjacent to said crimping, tearing the sections of said center portion thus formed from the side bars and bending them away from each other, then crimping the free end of the shorter center section, crimping the front end of the link blank and throwing around the free end of the smaller center section, shaping the front end of the link blank into final form and at the same time throwing still farther around the free end of the longer center section, and then commencing to roll up the larger center section, severing the partly formed link from the strip of metal and shaping the ends of both of said center sections into final shape, the larger section about the smaller end bar of the next preceding link in the series.

20. In a machine for making a chain link from a blank of sheet metal, said link having an offset attachment, the combination of forming and shaping elements for producing said link, with a bending element for producing said attachment and for fixing said attachment at desired angle to said link.

21. In a machine for making a chain link from a blank of flat sheet metal, said link having an offset attachment, the combination of a scoring element for imparting areas of score to said blank, a punch element for removing portions of said blank encompassed by said areas of score to produce a flat attachment, a bending element for shaping said flat attachment into a special attachment, and forming dies for producing said link.

22. In a machine for making chain from a strip of metal, the links of said chain having special attachments, the combination of a scoring element for imparting areas of score to said metal, a punch element for removing portions of said blank encompassed by said areas of score to produce a flat attachment, a bending element for shaping said flat attachment into a special attachment, and forming, shaping and connecting dies for producing and connecting said links.

23. In a machine for making a chain link from a blank of flat sheet metal, said link having a special attachment, side and end bars, the combination of means for producing a flat attachment, a bending element for producing a special attachment, and link forming and shaping elements, all arranged to act progressively upon said blank.

24. In a machine for making and connecting chain links from a strip of flat metal, each link having at least one special attachment, side and end bars, the combination of means for producing a flat attachment, a bending element for producing a special attachment, and link forming, shaping and connecting elements, all arranged to act progressively upon said blank.

25. In a machine for making a chain link from a blank of sheet metal, said link having at least one special attachment, side and end bars, the combination of a pair of relatively movable cooperating die blocks, each block provided with a plurality of relatively immovable attachment and link forming and shaping elements arranged to act progressively upon said blank.

26. In a machine for making and connecting chain links from a strip of metal, each link having at least one special attachment, side and end bars, the combination of a pair of relatively movable cooperating die blocks, each block provided with a plurality of relatively immovable attachment forming and shaping, and link forming, shaping and connecting elements, all arranged to act progressively upon said strip.

27. In a machine for making a chain link from a blank of flat sheet metal, said link having at least one special attachment, side and end bars, the combination with means for producing the special attachment, said means including a scoring element to provide areas of score upon said blank, a punch element to remove the portion of metal encompassed by said areas of score to provide a flat attachment, and a bending element to shape said flat attachment into a special attachment, of link forming and shaping elements to provide the side and end bars of said link.

28. In a machine for making and connecting chain links from a strip of flat sheet metal, each link having at least one special attachment, side and end bars, the combination with means for producing the special attachment, said means including scoring elements to provide areas of score upon said strip, punch elements to remove portions of metal encompassed by said areas of score to provide flat attachments, and bending elements to shape said flat attachments into special attachments, of link forming, shaping and connecting elements to provide the side and end bars of said links and to connect each link as formed with the next preceding formed link.

29. In a machine for making a chain link from a blank of flat sheet metal, said link having at least one special attachment, side bars, a relatively small end bar, and a relatively large end bar, the combination with means for producing the special attachment, said means including a scoring element to provide areas of score upon said blank, a punch element to remove the portion of metal encompassed by said areas of score to provide a flat attachment, and a bending element to shape said flat attachment into a special attachment, of link forming and shaping elements to provide the side and end bars of said link, said last mentioned elements including scoring knives to define the inner edges of said side bars, combined severing and crimping elements for crimping and severing the central portion of the link blank between said lines of score at a step in the formation of said blank into a link after the scoring knives have operated upon it, and means for forming the link blank into a completed link after it leaves said combined crimping and severing elements.

30. In a machine for making a chain link from a strip of flat sheet metal, said link having at least one special attachment, side bars, a relatively small end bar, and a relatively large end bar, a plurality of cooperating dies, said dies consisting of attachment forming and shaping, and link forming and shaping elements arranged to act progressively upon said strip and including severing elements for severing the link blanks from the strip after the last bending operation in the formation of each link is commenced.

31. In a machine for making a chain from a strip of flat sheet metal, the links of said chain having special attachments, side bars, a relatively small end bar, and a relatively large end bar, a plurality of cooperating dies, said dies consisting of attachment forming and shaping, and link forming, shaping and connecting elements, all arranged to act progressively upon said strip, and said link elements including severing elements for severing the link blanks from the strip after the last bending operation in the formation of each link is commenced and while said link is being connected with the next preceding formed link.

32. In a machine for making chain from a strip of flat sheet metal, the links of said chain having special attachments, the combination with means for producing the special attachments, said means including scoring elements to produce areas of score upon said strip, punch elements to remove portions of metal encompassed by said areas of score to provide flat attachments, and bending elements to shape said flat attachments into special attachments, of link forming, shaping and connecting elements, all adapted to act progressively upon said strip.

33. In a machine for producing conveyor or elevator chain from flat sheet metal, the links of said chain having offset attachments, the combination of scoring, punching and bending elements to produce said offset attachments, with forming, shaping and connecting elements for said links.

34. In a machine for producing conveyor or elevator chain from flat sheet metal, the links of said chain having offset attachments, the combination of scoring, punching and bending elements to first produce said offset attachments, with forming, shaping and connecting elements to afterwards produce and connect said links.

35. In a machine for producing conveyor or elevator chain from flat sheet metal, the links of said chain having offset attachments, side and end bars, the combination of scoring, punching and bending elements to first produce said offset attachments, with forming, shaping and connecting elements to afterwards produce said side and end bars and to connect each link as formed with the next preceding formed link.

36. In a machine of the character described, the combination of means for bending the side edges of a strip of metal to produce offset attachments, with means for scoring said strip to define the inner edges of the side bars of links, means for crimping the central portion of the link blank between said lines of score, transversely severing said central portion adjacent to said crimping, tearing the sections of said central portion thus formed from the side bars and bending them away from each other, means for crimping the free end of the shorter central section, crimping the front end of the link blank and throwing around the free end of the smaller center section, shaping the front end of the link blank into final form, and at the same time throwing still further around the free end of the said longer center section, and means for rolling up the larger center section, severing the partly formed link from the strip of metal and shaping the ends of both of said center sections into final shape, with the larger center section about the small end bar of the next preceding link in the series.

37. The process of making a chain link and attachment from a blank of sheet metal which comprises operating upon part of the blank to form the attachment in a plane different from the plane of the link, and subsequently operating upon another part of the blank to form the link.

38. In a machine of the class described, means for feeding a strip of metal through the machine, a set of dies adapted to form a plurality of successive link attachments from part of said strip, and sets of dies adapted to subsequently form a plurality of successive links from another part of said strip, with each link connected to one of said attachments.

39. In a machine of the class described, means for feeding a strip of metal through the machine, a set of dies adapted to form a plurality of successive link attachments from part of said strip adjacent at least one edge thereof, and sets of dies adapted to subsequently form a plurality of successive links from another part of said strip, with each link connected to one of said attachments.

40. In a machine of the class described, means for feeding a strip of metal through the machine, a set of dies adjacent the place where the strip enters the machine and disposed on one side of the center line thereof, said set being adapted to form link attachments, and sets of dies disposed along the center line of the strip as it passes through the machine and adapted to form links integral with said attachments, said attachments passing freely through the machine at the side of said sets of dies.

41. In a machine of the class described, means for feeding a strip of metal through the machine, a set of dies adjacent the place where the strip enters the machine and disposed on one side of the center line thereof, said set being adapted to form link attachments and to displace said attachments from the plane of the strip, and sets of dies disposed along the center line of the strip as it passes through the machine and adapted to form links integral with said attachments and substantially in the plane of the strip, said attachments passing freely through the machine at the side of said sets of dies.

42. The process of making a plurality of chain links from a strip of metal, each link having an integral attachment, which comprises first operating upon part of each successive blank in the strip to form the attachment part of said blank, and subsequently operating upon another part of each successive blank in the strip to form the link integral with the attachment.

Signed at Bridgeport, in the county of Fairfield, and State of Connecticut, this 16th day of December, A. D. 1924.

CHARLES PARKER.